Figure 1:
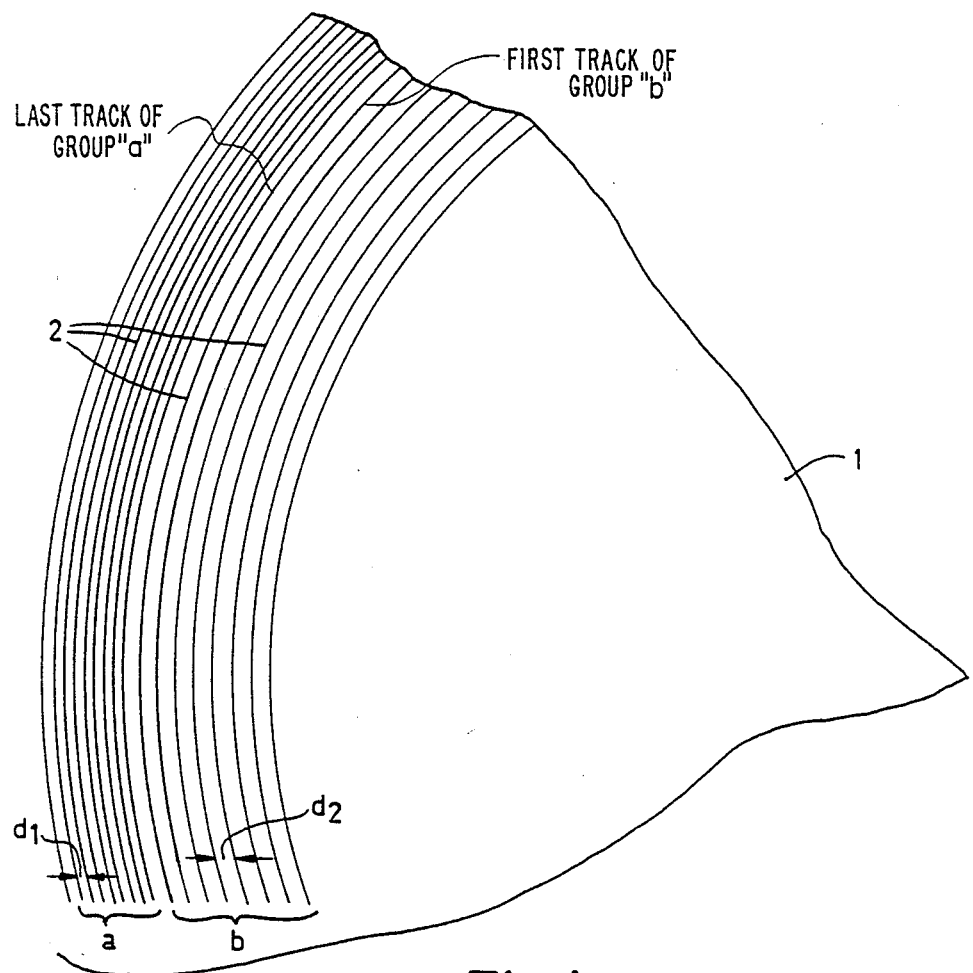

United States Patent [19]

Janssen

[11] Patent Number: 4,839,882
[45] Date of Patent: Jun. 13, 1989

[54] RECORD CARRIER WITH AN OPTICALLY READABLE TRACKWISE-ARRANGED INFORMATION STRUCTURE

[75] Inventor: Peter J. M. Janssen, Eindhoven, Netherlands

[73] Assignee: U. S. Philips Corporation, New York, N.Y.

[21] Appl. No.: 128,417

[22] Filed: Mar. 10, 1980

Related U.S. Application Data

[63] Continuation of Ser. No. 853,093, Nov. 21, 1977, abandoned, which is a continuation of Ser. No. 623,641, Oct. 20, 1975, abandoned.

[51] Int. Cl.$^4$ ................................................. G11B 7/00
[52] U.S. Cl. ..................................... 369/275; 369/100; 369/109; 358/342
[58] Field of Search ................................ 358/127–132, 358/342; 179/100.1 G, 100.3 V, 100.3 G, 100.3 B, 100.4 R, 100.4 C, 100.4 D; 365/120, 124; 274/41 R, 41.6 R, 42 R; 364/100, 109–111, 275; 250/219

[56] References Cited

U.S. PATENT DOCUMENTS

| | | | |
|---|---|---|---|
| 1,222,381 | 4/1917 | Frankel | 369/277 |
| 1,917,003 | 7/1933 | Williams | 179/100.3 V |
| 1,951,198 | 3/1934 | Mittell et al. | 179/100.3 V |
| 2,463,280 | 3/1949 | Kaehni et al. | 350/162 ZP |
| 2,864,896 | 12/1958 | Boontje et al. | 179/100.4 C |
| 3,223,789 | 12/1965 | Ooms | 179/100.4 C |
| 3,281,798 | 10/1966 | Glenn | 365/126 |
| 3,368,080 | 2/1966 | Nakagini et al. | 179/100.4 D |
| 3,483,633 | 12/1969 | Geils et al. | 179/100.4 D |
| 3,662,353 | 5/1972 | Chertok | 179/100.4 D |
| 3,711,658 | 1/1973 | Ward | 179/100.4 C |
| 3,737,877 | 6/1973 | Feenleib | 365/120 |
| 3,876,990 | 4/1975 | Silverman | 365/124 |
| 3,913,076 | 10/1975 | Lehareau et al. | 365/120 |
| 3,915,576 | 10/1975 | Taylor | 250/550 |
| 3,919,562 | 11/1975 | Whitman | 179/100.3 G |

FOREIGN PATENT DOCUMENTS 44-10304  5/1969  Japan .......................... 179/100.4 D Primary Examiner—Robert L. Richardson
Attorney, Agent, or Firm—Algy Tamoshunas

[57] ABSTRACT

A record carrier is described with an optically readable trackwise-arranged information structure, and an apparatus for reading said carrier. The distances between the tracks of the information structure vary so that by projecting, in addition to a read spot, at least one address spot to the information structure of a size such that is spans a number of tracks approximately equal the quotient of the average track distance and the amplitude of the track distance variation, the read spot can be rapidly addressed to a specific group of tracks. This is done with the aid of two detectors which are disposed in the path of the address-beam radiation which is diffracted in a first order by the information structure in a direction transverse to the track direction.

14 Claims, 4 Drawing Sheets

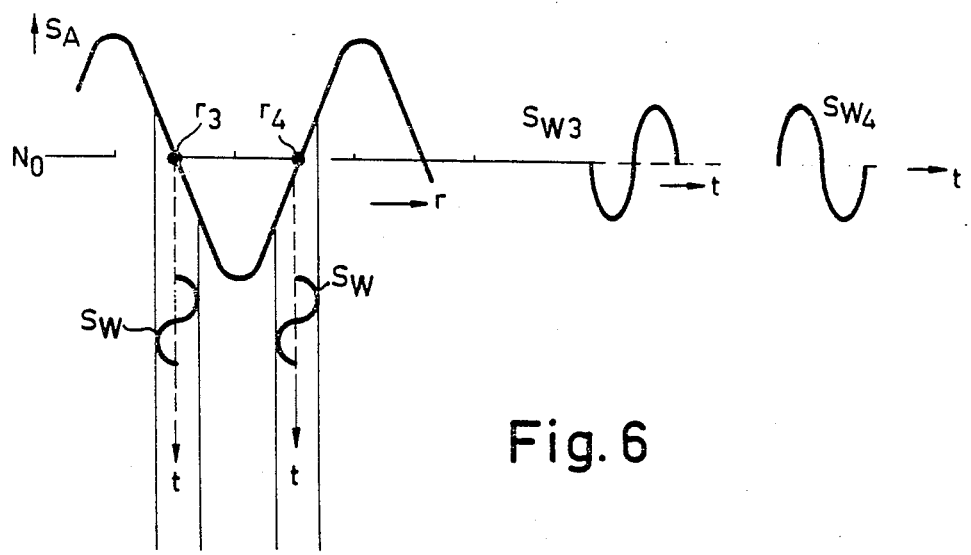
Fig. 6
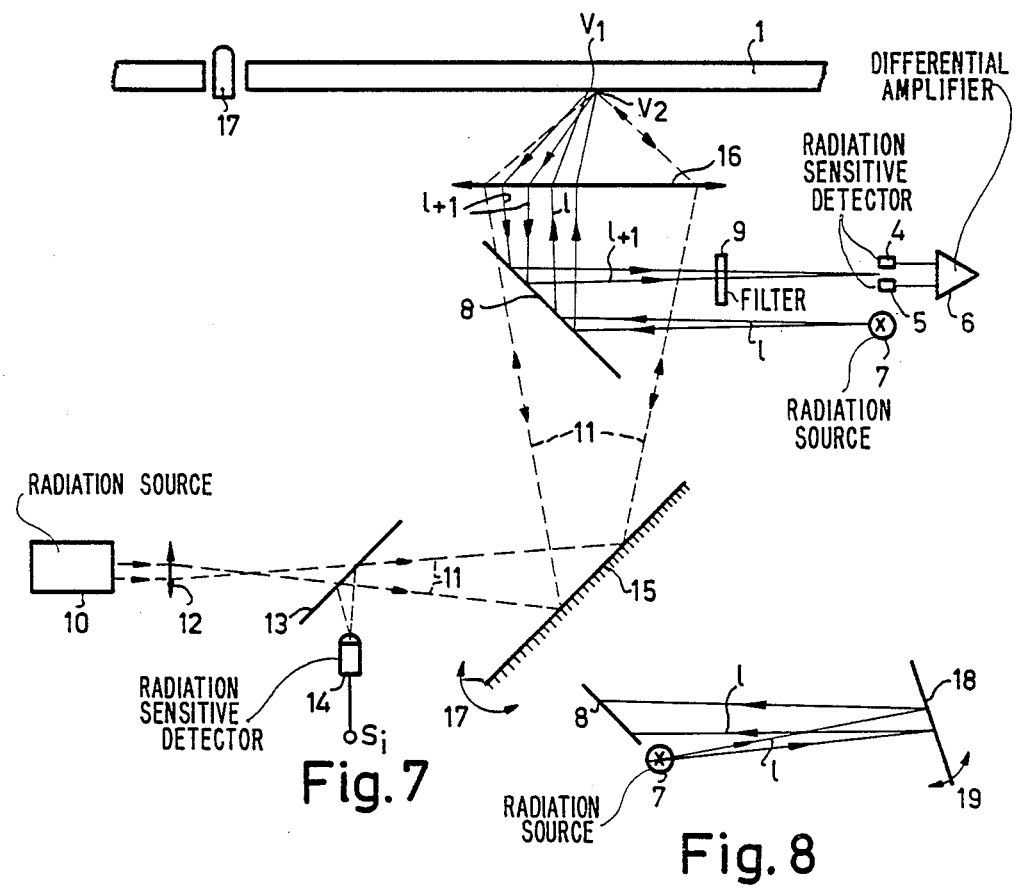
Fig. 7
Fig. 8

RECORD CARRIER WITH AN OPTICALLY READABLE TRACKWISE-ARRANGED INFORMATION STRUCTURE

This is a continuation of application Ser. No. 853,093, filed Nov. 21, 1977 and now abandoned, which was a continuation of Ser. No. 623,641, filed Oct. 20, 1975, now abandoned.

The invention relates to a record carrier which comprises an optically readable trackwise-arranged information structure. The invention also relates to an apparatus for reading such a record carrier.

In an article in "Philips'Technical Review", 33, No. 7, pages 186∝189, it is described how a disk-shaped record carrier can be read optically. A laser beam is focussed to a small read spot on the information structure by means of an objective system. The information structure is for example a phase structure and may comprise a multitude of pits pressed into the record carrier surface, the length of the pits and the distances between the pits representing the information stored. The diameter of the read spot is greater than the dimensions of the pits, so that these pits act as diffraction elements. When the read spot is projected onto a pit most of the radiation is diffracted beyond the range of a radiation-sensitive detector, while when the read spot is projected between two pits most of the radiation is passed to the detector.

Diffraction may also be utilized for keeping the center of the read spot always positioned on the center of a track to be read. For this purpose two additional radiation spots, which are radially offset relative to each other, may be projected onto the information structure. For each radiation spot a separate detector is provided. By comparing the radiation intensities received by these detectors a radial servo signal can be derived, by means of which for example the position of a rotatable mirror which is disposed in the radiation path can be adjusted.

Owing to the method of information storage and the method of reading, the known record carrier can contain a large amount of information. Apart from the storage of a (color) television program, this record carrier is therefore also suitable as a storage medium for the storage of all types of other information, such as for example x-ray images in a hospital, technical literature in a library, and digital information as is supplied or to be processed by a computer. For these applications it is essential that the read spot can be addressed to a specific track very rapidly. In order to enable the sequence number of the track to which the read spot is addressed at that instant to be determined at any instant, each track might be provided with address information. However, at a high radial velocity of the read spot the probability of erroneous reading of the address information increases. Moreover, the address information of a track is contained in a very small portion of that track, so that the address information for the various tracks are widely spaced apart in time. Alternatively, it is possible to count how many tracks the read spot has passed, by making use of the radial servo signal. However, since this signal is produced by diffraction at the pits, this signal may only be employed at low radial speed of the read spot. When the read spot is moved at high radial speed there is a risk of a track not being counted because the read spot does not pass over pits in that track.

It is an object of the present invention to provide means which enables the read spot to rapidly address a specific information section of the record carrier. According to a first aspect of the invention a record carrier is therefore characterized in that the distance between the tracks varies, the amplitude of the variation being smaller than the average distance between the tracks.

In accordance with the invention, an apparatus for reading such a record carrier includes a radiation source which supplies a read beam and an objective system for passing the read beam, via the record carrier, to a radiation-sensitive detection system. The detection system converts the read beam, which has been modulated by the information structure, into an electrical signal. The apparatus further comprises an auxiliary radiation source which supplies at least one address beam, the address spots formed by the address beams on the information structure covering a number of tracks which approximately equals the quotient of the average track distance and the amplitude of the track distance variation. Associated with each address beam are two auxiliary detectors disposed in the path of the radiation of the relevant address beam, which is diffracted in a first order by the information structure in a direction transverse to the track direction.

Owing to the variable distance between the tracks, a first-order diffraction sub-beam of the relevant address beam will move to and fro over the auxiliary detectors upon movement of an address spot and of the read spot associated therewith in a direction transverse to the track direction, so that the radiation intensities at the two detectors associated with the relevant address beam will vary relative to each other. The varying output signals of the detectors can be processed electronically to a counting signal, which indicates how many groups of tracks the address beam has passed. By, for example, making use of two address spots, which are radially shifted over a distance equal to approximately a quarter of the spatial period of the track distance variation, the sign of the displacement can be determined.

According to the invention it is now possible to address a specific group of tracks rapidly and faultlessly. Localization within a specific group of tracks may be effected in known manner, for example, with the aid of address information stored in the tracks.

A record carrier according to the invention may be employed for educational purposes. The subject matter on the record carrier is subdivided into chapters, which may comprise a great or less great number of tracks. The chapters, according to the invention, can be distinguished from each other in that the distance between the tracks of the different chapters are different, the track distance within one chapter being constant. Such a record carrier can also be read with the aid of an apparatus according to the invention. The chapters may have different lengths, i.e. they may comprise different numbers of tracks, so that the address spot cannot always cover all the tracks of a chapter. However, this is not necessary, because according to the invention it suffices when the address spot covers a number of tracks equal to the quotient of the average track distance and the amplitude of the track distance variation.

It is to be noted that it has been proposed previously, for example, in the German patent application No. 2,409,893, which has been laid open for public inspection, to make the radiation which is first-order diffracted by a track-shaped optical information structure cooperate with two detectors. However, in that case only one radiation spot of the order of magnitude of the track which is formed on the information structure. This radiation spot is employed as a read spot and positioning spot. Furthermore, the detectors are used for keeping the center of the read spot positioned on the centre of a track to be read, and not for rapidly addressing the read spot to a group of tracks.

Figure 2:
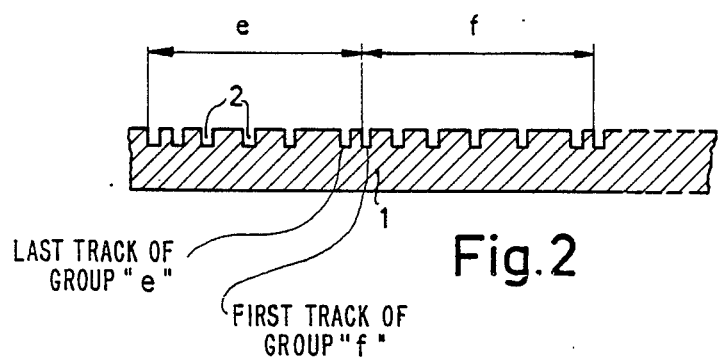
Figure 3:
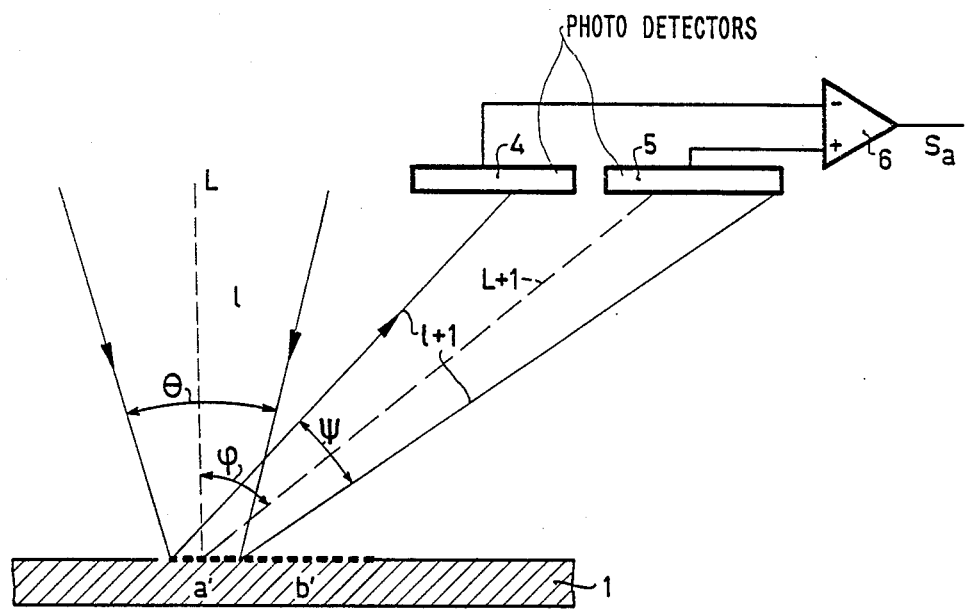
Figure 4:
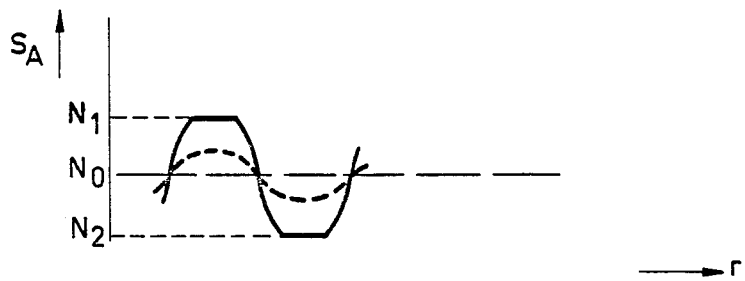
Figure 9:
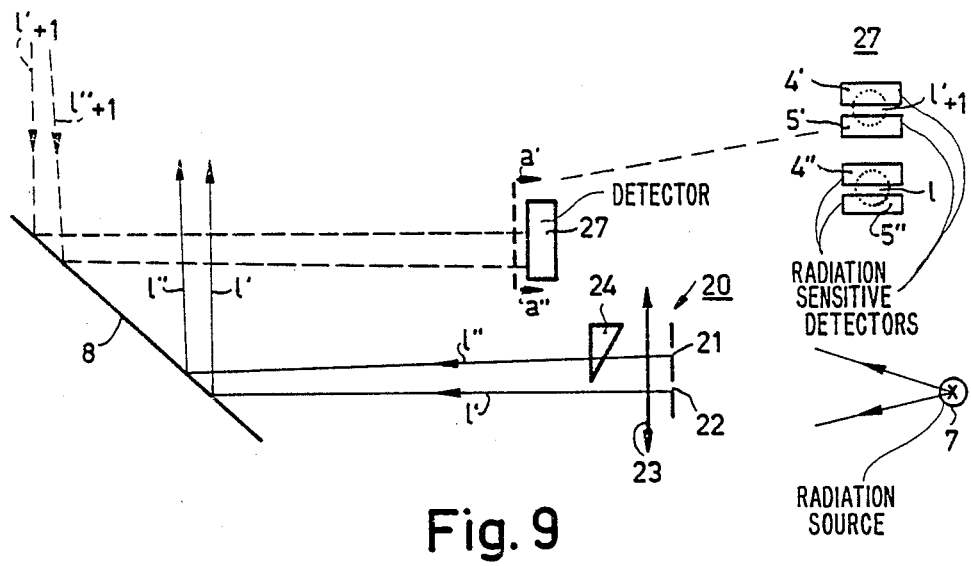
Figure 10:
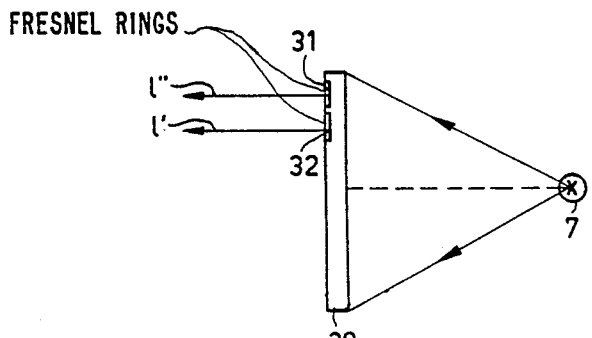
Figure 11:
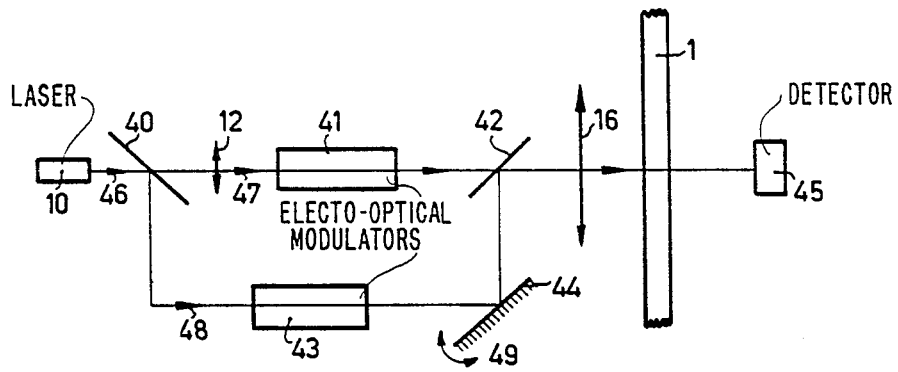

The invention will now be described with reference to the drawing, in which:

FIG. 1 shows part of a plan view of a first embodiment of a record carrier according to the invention, FIG. 2 shows a partial sectional view of an alternate embodiment of the record carrier, FIG. 3 is a schematic view of the light path of the address beam in accordance with the invention, FIG. 4 is a graph showing the error signal from the apparatus of FIG. 3 as the address beam moves over the record carrier, FIG. is a graph showing error signals from an alternate embodiment of the invention, FIG. 6 is a graph showing the results of a dithering type tracking servo in accordance with the invention, FIG. 7 schematically shows an apparatus according to the invention for reading a record carrier, FIG. 8 shows an alternate embodiment of the apparatus shown in FIG. 7, FIG. 9 is a schematic view of a further embodiment of the invention, FIG. 10 is a schematic view of a Fresnel lens to be used with the apparatus according to the invention, and FIG. 11 is a schematic view of a further alternate embodiment of the invention using a single light source.

FIG. 1 shows a part of a round disk-shaped record carrier according to the invention. This record carrier 1 comprises a multitude of circular tracks 2, which may be concentric or quasi-concentric. The tracks are divided into groups a and b each comprising, for example, eight tracks. The distance $d_1$ between the tracks of group a, as well as the distance $d_2$ between tracks of the group b, is constant. The distance $d_2$, however, is greater than the distance $d_1$. In FIG. 1 the difference between $d_1$ and $d_2$ has been exaggerated. In reality, the variation in the distance between the tracks will be approximately 10% of the average distance.

In FIG. 3 a small portion of the record carrier of FIG. 1, having the width of two groups of tracks a' and b', is shown in radial cross-section. The information structure is illuminated by an address beam 1, whose chief ray L is shown dashed. The address spot formed on the information structure by the address beam is approximately as wide as one group of tracks. For clarity the variation of the distance between the tracks has again been exaggerated. The adjacent tracks may be considered as a diffraction grating, which diffracts the address beam inter alia into a +1-order sub-beam $l_{+1}$, with a chief ray $L_{+1}$. The angle of aperture $\theta$ of the beam 1 is of the same order of magnitude as that of the sub-beam $l_{+1}$. Disposed in the path of the sub-beam $l_{+1}$ are two detectors 4 and 5. The outputs of these detectors are connected to a differential amplifier 6, at whose output an address signal $S_A$ is available. The variation of the signal $S_A$ as a function of the radial position r of the address spot is shown in FIG. 4.

The angle $\phi$ at which the sub-beam $l_{+1}$ is diffracted is determined by the period d in a radial direction of the track structure. If the center of the address spot coincides with the center of the group a', the diffraction angle $\phi$ will be comparatively great because the period of the track structure in the group a' is comparatively small. Most of the radiation of the diffracted sub-beam $l_{+1}$ is incident at the detector 5, while the detector 4 receives only a small portion of the radiation of the sub-beam $l_{+1}$. The signal $S_A$ will then have the level $N_1$. However, if the center of the address spot coincides with the center of the group b' the diffraction angle will be comparatively small, and the detector 4 will receive more radiation than the detector 5. The signal $S_A$ then has the level $N_2$. If the center of the read spot moves from the center of the group a' towards the center of the group b', a gradual transition will be produced in the signal $S_A$ from the level $N_1$ to the level $N_2$.

Upon a displacement of the read spot over the record carrier in a radial direction, the number of transitions in the signal $S_A$ is an indication of the number of track groups which the address spot has passed. This number of transitions can be counted electronically and compared with a desired number of track groups to be passed by the address spot. When the desired number is reached, for example a radially movable carriage, on which the optical means for the formation of the read spot and the address spot are mounted, can be stopped so that the read spot remains addressed to a specific group of tracks.

The manner in which the signal $S_A$ is electronically processed and the method of controlling the carriage are not the subject matter of the present invention and will therefore not be discussed.

If the address spot, and thus the read spot, is addressed to a specific group of tracks, the read spot can be addressed to a single track of the group by, for example, reading out a digital code contained in the tracks, which code represents the number of the relevant track, as described in application Ser. No. 344,868, filed Mar. 26, 1973, now abandoned. By means of this address information it is, for example, possible to adjust the position of a rotatable mirror which is disposed in the path of the read beam in such a way that the read spot is projected onto the desired track.

In the rapid-address method according to the invention, integration is effected over a comparatively large portion of the information structure (for example over 10 tracks). As a result, the effect of local disturbances in the information structure on the address signal $S_A$ will be small. The frequency with which the address signal is read out in the case where the period of the track distance variation comprises 20 tracks, is 20 times smaller than in the case of track-by-track counting. The address signal which is obtained according to the invention has a comparatively small frequency band, so that it is less sensitive to noise.

Instead of a record carrier in which all track distances within one group of tracks are the same, a record carrier may be chosen for which the distances between the tracks of one group are different. FIG. 2 shows a portion, having the width of two groups e and f, of such a record carrier in radial cross-section. Each group for example comprises six tracks. The distance between the tracks increases regularly, the variation within the group e being equal to that within the group f. In FIG. 2 the variations in track distance have been exaggerated again for clarity. In the read apparatus the record carrier of FIG. 2 is illuminated with an address spot whose width equals approximately half the width of one group of tracks. The signal $S_A$ which is produced when the address spot moves over a record carrier in accordance with FIG. 2 in a radial direction, has a smaller modulation depth (compare the dashed curve in FIG. 4) than the signal which is obtained if an address spot moves radially over a record carrier in accordance with FIG. 1. Hence, said last-mentioned record carrier is to be preferred.

If the variation of the diffraction angle $\phi$ equals the angle of aperture $\Psi$ of the beam $1_{+1}$, the address signal has a correct modulation depth, while the variation in track distance is nevertheless sufficiently small so that the information density on the record carrier does not essentially differ from that on a record carrier with uniform track distance. The angle of aperture $\Psi$ is given by $\sin \Psi = \lambda/D$, where $\lambda$ is the wavelength of the radiation and D the dimension of the address spot in the direction transverse to the track direction. If the chief ray of the address beam coincides with the optical axis of the objective system, the diffraction angle $\phi$ is given by $\sin \phi = \lambda/d$, where d is the local period of the track structure in a direction transverse to the track direction. It can be derived that for $\Delta\phi = \Psi$ it is true that $d_{aver}.\Delta d$ approximately equals $1/x$, where x is the number of tracks which is covered by the address spot and $d_{aver}$ the average track distance. For a record carrier according to FIG. 1, if $\Delta d = 1/10 \, d_{aver}$, groups of 10 tracks will yield a correctly modulated address signal. In the case of a smaller a number of tracks per group the address signal modulation is no longer optimum, but still usable. In practice, it has been found that if the address spot still covers five tracks at a $\Delta d = 1/10 \, d_{aver}$, the address signal $S_A$ is still just usable.

Also for reading a record carrier in which the information is divided into a number of chapters which comprise a greater or lesser number of tracks, the address spot need only cover a number of tracks which is given by $d_{aver}/\Delta d$.

Figure 5:
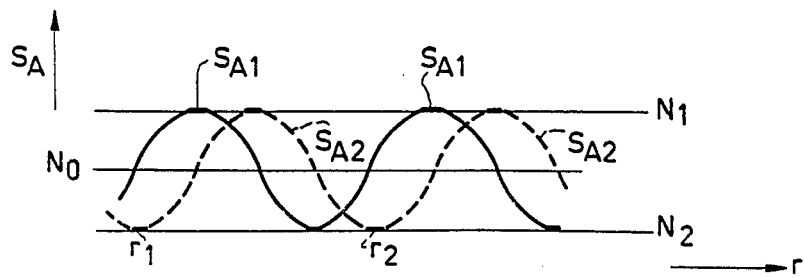

In order to enable the sign of the displacement of an address spot over the record carrier to be determined, a second address spot which is radially shifted relative to the first address spot may be formed on the record carrier, in such a way that the address signal $S_{A1}$ produced by the first address spot is phaseshifted relative to the address signal $S_{A2}$ produced by the second address spot. FIG. 5 shows these address signals as a function of the radial position r.

By determining how the other signal varies in the points where the one signal has the level $N_2$, for example $r_1$, $r_2$, the sign of the displacement of the read spots can be determined. If the value of $S_{A1}$ increases upon a displacement of the address spots from the positions $r_1$ and $r_2$, the address spots for example move from the outside towards the inside. However, if the value of $S_{A1}$ decreases from the positions $r_1$ and $r_2$, the address spots move from the inside towards the outside.

For a satisfactory signal-to-noise ratio the address spots are preferably shifted in a radial direction over a distance which equals a quarter period of the track distance variation, so that the phase shift between $S_{A1}$ and $S_{A2}$ is 90°. However, also for a phase shift in a range between 60° and 120° the method of FIG. 5 may still be used.

Instead of using two address spots, the sign of the displacement may also be determined with only a single address spot, which is periodically moved over the tracks in a radial direction. The amplitude of the periodic displacement is smaller than the dimension of the address spot in a radial direction. The periodic displacement of the address spot may for example be obtained by means of a mirror which is disposed in the path of the read beam and which oscillates at a frequency of, for example, 30 kHz.

FIG. 6 again shows the variation of the address signal $S_A$ as a function of the radial position r. The curve $S_w$ represents the periodic movement of the address spot as a function of time t. As a result of the periodic movement, the signal $S_A$ is time modulated for any radial position of the read spot; compare the curves $S_{w3}$ and $S_{w4}$. These curves, correspond to the radial positions $r_3$ and $r_4$ where the address signal has the level $N_o$. By comparing the phase of the signal $S_{w3}$ and of the signal $S_{w4}$ in the points $r_3$ and $r_4$ with the phase of the signal $S_w$ the sign of the displacement of the address spot can be determined. If $S_{w4}$ is in phase with $S_w$ and $S_{w3}$ is in phase opposition o $S_w$, the address spot for example moves from the outside towards the inside. However, if $S_{w3}$ is in phase and $S_{w4}$ is in phase opposition with $S_w$, the address spot will move from the inside towards the outside.

FIG. 7 schematically shows an apparatus according to the invention for reading a record carrier. The record carrier 1, shown in radial cross section, is provided with a multitude of tracks, not shown. By way of example it has been assumed that the information structure is radiation-reflecting and is disposed at the underside of the record carrier. The record carrier is, for example, illuminated by a read beam 11 which is obtained from a radiation source 10, for example a helium-neon laser. This read beam is focussed to a read spot $V_1$ by means of an objective system, which for simplicity is represented by a single lens 16. The auxiliary lens 12 ensures that the pupil of the objective system is filled, so that the read spot $V_1$ is diffraction limited. The dimensions of the spot $V_1$ are of the order of magnitude of the information details of the information, structure. After reflection at the record carrier the read beam 11 again traverses the objective system and is subsequently directed towards a radiation-sensitive detector 14 by a beam-separating element, for example, in the form of a semi-transparent mirror 13. At the output of this detector a signal $S_i$ is obtained which, upon rotation of the record carrier around an spindle 17, is time modulated in accordance with the information contained in a track to be read. The complete read apparatus can be mounted on a carriage, not shown, which can be radially moved underneath the record carrier.

By means of this carriage it is also possible to rapidly address the read spot $V_1$ to a specific group of tracks. For detecting whether the read spot has been addressed to the desired group of tracks, an auxiliary beam 1 is employed according to the invention. This auxiliary beam is supplied by an auxiliary radiation source 7, for example a diode which emits infrared radiation (LED). The auxiliary beam 1 is coupled into the path of the read beam 11 by a dichroic mirror 8, which reflects infrared radiation and which transmits the radiation of the helium-neon laser. As the auxiliary beam 1 fills only a small portion of the pupil of the objective system, the dimensions of the address spot $V_2$ formed by said beam are substantially greater than the dimensions of the read spot $V_1$.

As has been described hereinbefore, the information structure will diffract the address beam inter alia into n +1-order sub-beam ($1_{+1}$), the direction of said sub-beam depending on the local distance between the tracks. The sub-beam $1_{+1}$ is reflected by the dichroic mirror 8 towards two detectors 4 and 5, whose outputs are connected to a differential amplifier 6, which supplies an address signal $S_A$. If required, a filter 9 which transmits only infrared radiation may be included in the path of the beam $1_{+1}$.

In the apparatus of FIG. 7 care has been taken that the address beam 1 enters the objective system at some distance from the optical axis of this system, so that the sub-beam $1_{+1}$ does not traverse the periphery of the objective system, but passes through the objective system at some distance from this periphery.

After the optical read apparatus has been rapidly directed to a specific group of tracks with the aid of the signal $S_A$, the read spot can be addressed to one specific track within the group with the aid of, for example a mirror 15, which is rotatable in the direction of the arrow 17. The mirror 15 may also be employed to ensure that the center of the read spot always remains positioned on the center of a track to be read. A control signal for this fine control may for example be derived with the aid of two additional auxiliary radiation spots, projected on the information structure, which are radially shifted relative to the read spot, as is described in the articles cited in the introduction.

As previously stated, the sign of the displacement of the read spot can be determined with only one address spot, if said spot is periodically moved transversely across the tracks with a small amplitude. The periodic movement can be obtained with the aid of an oscillating mirror included in the radiation path of the beam 1, such as the mirror 18 of FIG. 8, which oscillates in the direction of the arrow 19.

The sign of the displacement of the read spot may alternatively be determined with the aid of two address spots. FIG. 9 shows how two address beams can be obtained. In this Figure the part of the radiation path behind the dichroic mirror 8 is shown in more detail.

Disposed in the path of the radiation supplied by the auxiliary radiation source 7 is a lens 23. A diaphragm 20 with two apertures 21 and 22 is positioned between the source 7 and lens 23. The two beams emerging from the apertures 21 and 22 are employed as address beams 1' and 1". These address beams, of which for simplicity only the chief rays are shown, can be collimated by the lens 23. The beams 1' and 1" are reflected to the objective system of the read apparatus by the dichroic mirror 8 shown in FIG. 7. In order to ensure that the address spots formed on the information structure by the address beams are radially shifted over, for example, a quarter period of the track distance variation, the collimated beams 1' and 1" should have different directions. For this purpose for example a wedge-shaped element 24 may be included in the path of the beam 1".

Included in the path of the sub-beams, which are diffracted in the +1-order by the information structure, is a composite detector 27. This detector comprises a first pair of detectors 4' and 5' which cooperate with the sub-beam $1'_{+1}$, and a second pair of detectors 4" and 5" which cooperate with the sub-beam $1''_{+1}$. In the right-hand part of FIG. 9 a view of the composite detector is shown in accordance with the line a' a".

Instead of the lens 23 a Fresnel zone plate may be employed. Such a plate is generally a glass plate with alternate radiation-transmitting and radiation-absorbing annular zones. Instead of such an amplitude structure, it is alternatively possible to use a phase structure, the consecutive annular zones producing a path length difference of $\lambda/2$ in a radiation beam, $\lambda$ being the wavelength of the radiation which is used. A Fresnel zone plate has the property that it forms a real image of a point on the optical axis of the plate, use being made of diffraction.

Only small portions of the lens 23 around the passages of the beams 1' and 1" through said lens are used. According to the invention the elements 20, 23 and 24 may be replaced by a glass plate 30 on which two small areas 31 and 32 with Fresnel rings are provided, as is shown in FIG. 10. With the aid of, for example, a computer, it is possible to calculate the structures of annular zones of the Fresnel areas 31 and 32 required to ensure that the address beams 1' and 1" pass through said system at some distance from the optical axis of the objective system. Furthermore, the structures of the Fresnel areas can be made to differ in such a way that the directions of the address beams 1' and 1" are different, so that the address spots on the information structure are radially shifted over a distance which equals approximately a quarter of the spatial period of the track distance variation.

Instead of using a separate auxiliary radiation source, an address beam may also be formed from the radiation of the source 10, as is schematically shown in FIG. 11. Disposed in the path of the laser beam 46 is a dividing mirror 40 which splits the beam into a read beam 47 and an address beam 48. With the totally reflecting mirror 44, which can for example oscillate in accordance with the arrow 49, and the semi-transparent mirror 42, the address beam is directed to the objective system 16. The record carrier 1 is now assumed to be radiation-transmitting. Disposed on the other side of the record carrier is a composite detector 45 which includes the detectors 4, 5 and 14 shown in FIG. 7. The path of the read beam 47 and that of the address beam 48 includes, for example, an electron-optical modulator 41 and 43 respectively. The electron-optical modulators are controlled so that first the read beam is blocked and the address beam is transmitted, so that it is possible address to a specific group of tracks. Subsequently, the address beam is blocked and the read beam is transmitted so that reading may commence.

The address spots on the information structure may be round spots. However, it is also possible to use rectangular spots, the longitudinal direction of the spot being disposed in the track direction and the length of the spot being substantially greater than the width. In that case a comparatively large area of the information structure may be utilized, so that local inaccuracies in said structure will have little effect on the address signal.

The fact that the invention has been described with reference to a round disk-shaped record carrier does not imply that it is limited thereto. The invention may be employed in all record carriers with an optically readable information structure which consists of a multitude of tracks, for example, noncircular memory cards. The term radial direction in the preceding text should then read "lateral direction of the tracks".

What is claimed is:

1. A record carrier for storing information comprising a substrate having thereon an optically readable information structure comprised of a plurality of generally parallel, spaced apart elongated information tracks containing information stored along the length thereof, which information is retrieved by a read beam of radiation which is directed onto the track to be read and is modulated in accordance with information stored in that track as the read beam traverses the length of the track to be read, said tracks being arranged in at least two juxtaposed groups each containing a plurality of said tracks, the spacing between tracks in at least contiguous portions of adjacent groups varying from group to group such that when said structure is scanned by a spot of radiation spanning a plurality of said tracks and moving relative to the record carrier in a direction transverse to the longitudinal direction of said tracks, the variation in the spacing between tracks produces a detectable change in the radiation comming from the record carrier as the spot moves from one to the other of said groups.

2. The record carrier according to claim 1 wherein said variation in said spacing between tracks is such that a change in the direction in which said radiation coming from said record carrier is diffracted is producesd as said spot moves from one to the other of said groups.

3. The record carrier according to claim 1 wherein the amplitude of the variation is smaller than the average distance between said tracks.

4. The record carrier according to claims 1 or 2 wherein the distance between tracks in each group is uniform and differs from the distance between tracks in an adjacent group.

5. The record carrier according to claims 1 or 2 wherein the distance between tracks in each group varies regularly.

6. An apparatus for reading information stored in a record carrier having an optically detectable structure comprising a plurality of generally parallel, spaced apart elongated tracks in which the information is stored, the spacing between said tracks in at least portions of said optical structure varying with an amplitude of variations smaller than the average distance between the tracks, said apparatus comprising a radiation source for producing a read beam of radiation, a radiation sensitive detection system, an objective system for passing said read beam via the record carrier to said detection system, said detection system converting radiation of the said beam which has been modulated by the information structure into an electrical signal, means for supplying at least one address beam of radiation, means for forming, from radiation of each address beam, an address spot of a size such that address spot spans a number of tracks which approximately equals the quotient of the average distance between tracks and the amplitude of the variation of the distance between tracks, and two auxiliary detectors associated with each address beam, said auxiliary detectors being disposed in the path of the radiation of the associated address beam which is diffracted in a first order by the information structure in a direction transverse to the track direction.

7. An apparatus as claimed in claim 6 wherein said address spot is rectangular, the long sides of said address spot being disposed in the longitudinal direction of the tracks and being several times greater than the short sides of the address spot.

8. The apparatus according to claim 6 including means for periodically moving said address spot across said tracks in a direction transverse to the track direction, the amplitude of the periodic movement being smaller than the dimension of the address spot in a direction transverse to the track direction.

9. The apparatus according to claim 6 wherein said supplying means supplies two of said address beams such that the two address spots formed therefrom are shifted transversely to the track direction over a distance equal to approximately a quarter of the period of the track spacing variation.

10. The apparatus according to claim 9 wherein said forming means includes said objective system which is arranged so that said address beams pass therethrough with the axes thereof spaced by a distance from the optical axis of said objective system.

11. The apparatus according to claim 6 wherein said supplying means includes means for splitting the beam produced by said source into two beams, one of said beams defining said read beam and the other defining said address beam, and including a controllable beam interrupting means disposed in the path of each of said address and read beams, and wherein said forming means includes said objective system and means for directing said address beam to said objective system.

12. The apparatus according to claim 6 wherein said supplying means includes an auxiliary radiation source for producing said address beam.

13. The apparatus according to claim 12 wherein said auxiliary radiation source produces radiation of a different wavelength than that of the read beam and wherein said forming means includes said objective system, and including a wavelength dependent element for directing said address beam to said objective system and for directing the address beam coming from the information structure to said auxiliary detectors associated therewith.

14. The apparatus according to claims 12 or 13 wherein said supplying means includes a plate having two areas with Fresnel rings disposed in the path of radiation produced by said auxiliary radiation source so as to produce two of said address beams from the radiation produced by said auxiliary source.

* * * * *